United States Patent [19]

Frisby

[11] 4,252,088
[45] Feb. 24, 1981

[54] DIFFERENTIAL SWITCH FOR DETECTING LEAKS

[76] Inventor: Gerald R. Frisby, P.O. Box 20295, Billings, Mont. 59102

[21] Appl. No.: 617,106

[22] Filed: Sep. 26, 1975

Related U.S. Application Data

[63] Continuation of Ser. No. 460,595, Apr. 12, 1974, abandoned.

[51] Int. Cl.³ .............................................. F22B 37/44
[52] U.S. Cl. .................................... 122/507; 137/460; 200/81.9 M; 340/605
[58] Field of Search .................. 200/81.9 M; 122/504, 122/507; 340/242; 335/207; 137/460

[56] References Cited

U.S. PATENT DOCUMENTS

| | | | |
|---|---|---|---|
| 2,103,747 | 12/1937 | Hamilton | 200/81.9 M |
| 2,307,304 | 1/1943 | Rudd | 200/81.9 M |
| 2,750,581 | 6/1956 | Darian | 340/242 |
| 3,016,525 | 1/1962 | Hauck | 340/242 |
| 3,063,432 | 11/1962 | Bond | 122/504 |
| 3,360,621 | 12/1967 | Liddell | 200/81.9 M |
| 3,365,710 | 1/1968 | Duplessy | 340/242 |
| 3,473,553 | 10/1969 | Collins | 122/504 X |

FOREIGN PATENT DOCUMENTS

| | | | |
|---|---|---|---|
| 568148 | 12/1958 | Canada | 137/460 |
| 741484 | 12/1955 | United Kingdom | 200/81.9 M |

*Primary Examiner*—Harold W. Weakley
*Attorney, Agent, or Firm*—Saidman & Sterne

[57] ABSTRACT

A flapper is provided in the inlet and outlet lines to a domestic hot water heater or the like and a permanent magnet is affixed to the bottom portion of each of the flappers. Immediately adjacent each flapper and outside of the pipe, a magnetically operated switch is placed. The magnetically operated switches are connected in circuit with a relay which in turn controls a solenoid valve for cutting off or permitting the entry of water from the source into the inlet pipe. Under normal operating conditions when there is a flow of water in the inlet pipe and the outlet pipe the connection of the magnetically operated switches is such that the relay will not operate and the solenoid actuated valve will be open permitting the entry of water from the source. When a leak occurs, the ensuing movement of the flappers caused by the change in liquid flow will operate their associated magnetic switches, causing the relay to be actuated and closing the solenoid actuated valve, thus cutting off the supply of water. A thermal time delay switch is incorporated in the circuit to prevent the actuation of the magnetic switches in response to "water hammer" or the like.

12 Claims, 2 Drawing Figures

DIFFERENTIAL SWITCH FOR DETECTING LEAKS

This is a continuation of application Ser. No. 460,595, filed Apr. 12, 1974, now abandoned.

BACKGROUND OF THE INVENTION

This invention relates generally to safety devices for turning off the water supply to domestic hot water heaters or the like, when a leak has developed. In the past, a serious problem has existed when a leak has developed in a home owner's hot water heater. After returning from a vacation or some other extended trip, it was not uncommon to find a basement flooded because of a leak which developed in the hot water heater. Often this would lead to extensive property damage and great inconvenience to the home owner.

Clearly then, it would be highly desirable to have a system which can be readily installed in the domestic hot water heating unit and which would automatically turn off the supply of water to the unit when a leak developed. However, up to the present time, no such system has been available.

Accordingly, it is a principal object of the present invention to provide a system which would automatically turn off the water supply to a hot water heater, when a leak developed.

A further object of the present invention is to provide such a system which is responsive only to a leak and will not turn off the water supply in response to "water hammer" or another similar condition.

SUMMARY OF THE INVENTION

The foregoing objects of the present invention are realized by providing a system which incorporates a flapper having a permanent magnet mounted thereon disposed in the inlet pipe leading to the hot water heater and a similar device disposed in the outlet pipe leading from the hot water heater. Mounted outside each pipe and in proximity to the magnets carried by the flappers are magnetically actuated switches connected in series with each other. Under conditions of normal water flow and no leakage, the magnets carried by the flappers will be so polarized that the inlet switch will be closed and the outlet switch will be open. Under this condition, a relay connected with a solenoid actuated valve controlling the water supply will be unactuated and a normal water supply will continue. However, when a leak occurs between the inlet and outlet pipes, the outlet flapper will cause its associated switch to close and a circuit will be completed, actuating the relay and causing the solenoid actuated valve to cut off the water supply, thus preventing any further leakage. Also incorporated in the circuit is a thermal time delay switch which permits the relay to be actuated only after a predetermined time has passed from the closing of the outlet magnetically actuated switch. Thus, in the case of "water hammer", the outlet switch will only close very briefly and the thermal time delay switch will remain open and not permit the relay to be actuated. Therefore, in the presence of "water hammer" and other similar transient conditions, the water supply will continue unabated.

BRIEF DESCRIPTION OF THE DRAWINGS

In the accompanying drawing which forms part of the instant specification and is to be read in conjunction therewith and in which like numbers refer to like parts throughout the several views.

DESCRIPTION OF THE PREFERRED EMBODIMENT

Figure 1:
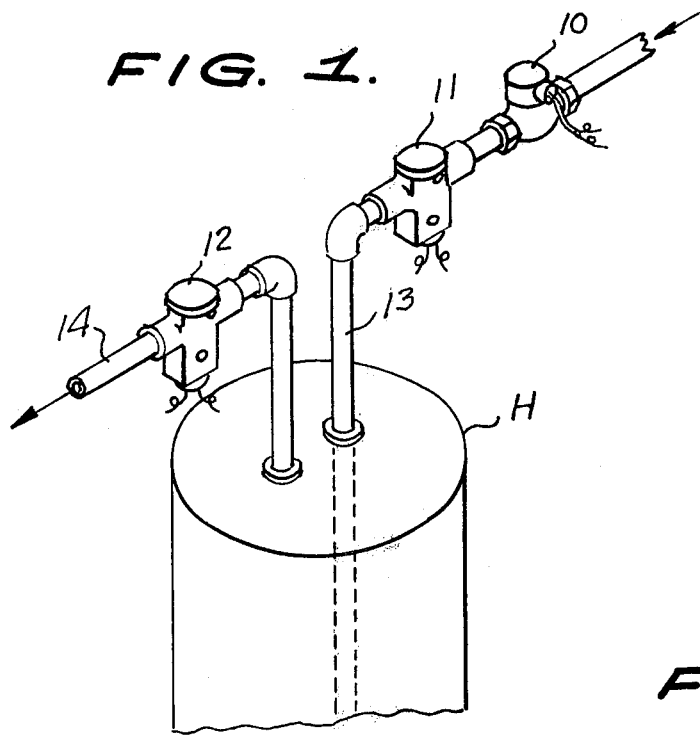
FIG. 1 is a partial perspective view showing the disposition of the system of the present invention disposed in a typical hot water heater.

Referring now to FIG. 1 of the drawing, there is shown a typical residential hot water heater H having an inlet pipe 13 and an outlet pipe 14. Disposed in the inlet pipe 13 is solenoid actuated valve 10 which controls the entry of water from the supply to the hot water heater H. Disposed between solenoid actuated valve 10 and the hot water heater H is inlet switch unit 11, the structure and function of which will be described more fully below. Similarly disposed in outlet pipe 14 is outlet switch unit 12. As will be described hereinbelow, switch units 11 and 12 and their associated circuitry function so as to close solenoid actuated valve 10 and cut off the water supply to the hot water heater H when a leak occurs.

Figure 2:
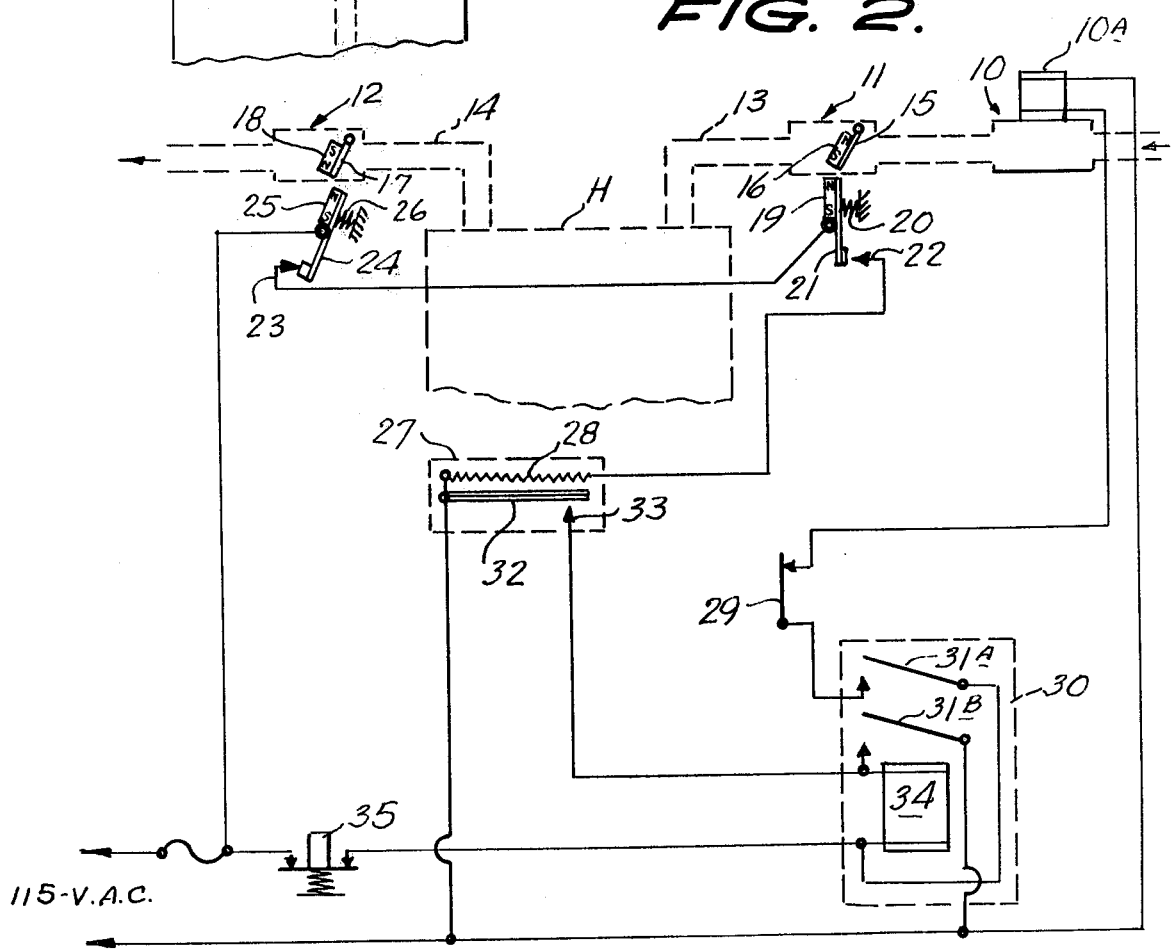
FIG. 2 is a schematic wiring diagram of the present invention.

Referring now to FIG. 2, it can be seen that inlet switch unit 11 comprises a flapper 15 pivotably mounted within inlet pipe 13 and having secured thereto permanent magnet 16. Disposed in proximity to magnet 16 and outside pipe 13 is oppositely poled magnet 19 mounted on pivotable contact arm 21, spring biased by spring 20 so that its contacts 22 are normally closed. However, in a condition of equilibrium, when no water is drawn from hot water heater H, flapper valve 15 will be seated in the position shown in FIG. 2 and magnet 19 will be attracted by magnet 16 and open contracts 22, as shown in FIG. 2.

Similarly, outlet switch unit 12 comprises flapper 17 having permanent magnet 18 attached thereto and mounted within outlet pipe 14. Outside pipe 14 and in proximity to magnet 18 is like poled permanent magnet 25 affixed to pivotable contact arm 24 which is biased by spring 26 in such a direction that its contacts 23 are normally open. However, in a condition of equilibrium such as illustrated in FIG. 2, flapper 17 is seated and like poled magnets 18 and 25 repel each other, forcing contact arm 24 to the position illustrated against the force of spring 26, so that contacts 23 are closed.

Contact arms 24 and 21 and their respective associated contacts 23 and 22 are connected in series with each other and with resistive element 28 of thermal delay relay 27 having contact arm 32 and contact 33. Thermal time delay relay 27 is constructed so that after a predetermined time, which may in the preferred embodiment of the invention be ten to fifteen seconds, contact arm 32 will be displaced so as to close contact 33 as a result of the heating effect of resistance element 28. One end of resistive element 28 is connected to one side of the 115-volt A.C. source and contact 33 is connected to one end of the coil 34 of relay 30. The other side of coil 34 is connected to the A.C. source via normally closed reset switch 35. Relay 30 is provided with two sets of contacts, 31A and 31B. Contacts 31A serve to connect the 115-volt source to solenoid 10A of solenoid actuated valve 10, when relay 30 is energized. The other set of contacts, 31B, are holding contacts which maintain relay 30 in the energized condition until reset switch 35 is depressed, removing the source voltage from coil 34.

The operation of the subject invention will now be described. In the normal, or equilibrium condition, there is no fluid flow in the input or output. In this condition, flappers 15 and 17 are seated in the positions shown in FIG. 2 and contacts 22 are open, while contracts 23 are closed, for the reasons set forth above.

When fluid is drawn from hot water heater H via output pipe 14, as by the opening of a valve at a source of demand, water will flow through pipes 13 and 14, forcing flappers 15 and 17 from their seated positions and upwardly, as viewed in FIG. 2, away from magnets 19 and 25. This action will cause spring 20 to close contacts 22, since magnet 19 will no longer be influenced by magnet 16 and similarly, spring 26 will pivot contact arm 24 in a direction such that contacts 23 will open, since magnet 25 will no longer be repelled by magnet 18. In this condition, as in the first condition described above, relay 30 will not be actuated, since at least one of the series connected contacts 23 or 22 will be open at all times, disconnecting the A.C. source from the circuit.

When the fluid flow ceases, as by a valve at the source of demand being turned off, contacts 23 and 22 will, of course, return to the normal, or equilibrium condition described above.

When a normal demand for water is not made, as by the opening of a valve at a remote point, but rather a leak or loss of water occurs at a point between inlet switch unit 11 and outlet switch unit 12, contacts 22 will close, by the action described above, since water will continue to be drawn through normally opened solenoid actuated valve 10. However, since there will be no fluid flow in outlet pipe 14, contacts 23 will also remain closed and the circuit to the source voltage will be completed via closed series connected contacts 22 and 23.

With contacts 22 and 23 closed, current will flow through resistive element 28 of thermal time delay relay 27, and after a predetermined time delay of approximately ten to fifteen seconds, contact arm 32 will make electrical contact with contact 33. This time delay guards against the activation of the circuit in the presence of so-called "water hammer" which is created by the sudden turning off of the water on the outlet side of hot water heater H.

With an electrical circuit completed between contact arm 32 and contact 33, the source voltage will be placed across coil 34 of relay 30, causing contacts 31A and 31B to close. As noted hereinabove, the closing of contacts 31A connects solenoid 10A of valve 10 to the source voltage, via normally closed switch 29, closing valve 10 and cutting off the supply of water to the hot water heater. At the same time, the closing of contacts 31B maintains the source voltage in electrical connection with coil 34 so that relay 30 will continue to be energized. This provides a safety factor, if for any reason thermal time delay relay 27 should open.

After the leak or fluid loss has been corrected, manually actuated switch 29 is opened, removing power from solenoid 10A, and permitting water to again enter the system via valve 10. After the refilling operation has taken place and the system has once again resumed its normal or equilibrium state, switch 29 is again closed and reset switch 35 is depressed, removing the source voltage from coil 34 and causing contacts 31A and 31B to open. This operation returns the entire system to the condition shown in FIG. 2 wherein it is in readiness for further operation in the event of another leak.

While a specific embodiment of the invention has been described as applied to domestic hot water heaters, it should be realized that the principles disclosed herein could be readily adapted to any type of piping system carrying liquid, gas or emulsified solids. Depending upon the particular substance carried by the piping system, the external magnetic switches would, of course, have to be readjusted and recalibrated. Further, it should be realized that other changes in the specific embodiment described above will be apparent to those skilled in the art and that, therefore, it is intended that the scope of the invention be limited only by the claims appended hereinbelow.

What is claimed is:

1. In a hot water heating system comprising a hot water heater having an inlet pipe and an outlet pipe, apparatus for cutting off the water supply to the system in response to a leak in said system, comprising:
   (a) valve means disposed in said inlet pipe for selectively admitting or cutting off water flow to said inlet pipe;
   (b) first magnetically responsive switch means disposed outside and adjacent said inlet pipe;
   (c) second magnetically responsive switch means disposed outside and adjacent said outlet pipe;
   (d) first water flow responsive switch activating means disposed within said inlet pipe comprising a freely pivotable flapper valve having a permanent magnet attached thereto and disposed in the path of said water flow, said flapper valve being seatable so that it may be moved from its seat only in the direction of water flow;
   (e) second fluid responsive switch activating means disposed within said outlet pipe comprising a freely pivotable flapper valve having a permanent magnet attached thereto and disposed in the path of said water flow, said flapper valve being seatable so that it may be moved from its seat only in the direction of water flow; and
   (f) means for closing said valve means in response to any movement of said first flapper valve away from its seated position in response to any water flow in said inlet pipe, with no movement of said second flapper valve away from its seated position corresponding to no fluid flow in said outlet pipe.

2. The apparatus set forth in claim 1 wherein said means for closing said valve means comprises a voltage source; voltage responsive switching means connected between said voltage source and said valve means, said valve means being voltage responsive; and means interconnecting said first and second switch means, said voltage source and said switching means so that said switching means applies voltage from said voltage source to said valve means to close the same.

3. The apparatus set forth in claim 2 further including means for delaying the application of voltage to said valve means for a predetermined period of time after said first flapper valve moves away from its seated position in response to water flow in said inlet pipe and no movement of said second flapper valve away from its seated position occurs, corresponding to no fluid flow in said outlet pipe.

4. The apparatus set forth in claim 3 wherein both said first and second switch means close in order to apply voltage to said valve means after said predetermined period of time and wherein under equilibrium conditions one of said switch means is open and the other of said switch means is closed and under conditons of normal fluid flow in said system the open and closed conditions of said first and second switch means reverse from their positions during equilibrium conditions.

5. The apparatus set forth in claim 3, wherein said means for delaying comprises time delay switching means connected in circuit with said first switch means, said voltage source and said voltage responsive switching means.

6. The apparatus set forth in claim 3, further including means for resetting said voltage responsive switching means to its initial condition and means for maintaining said voltage responsive switching means in its switched condition until said resetting means is actuated.

7. The apparatus set forth in claim 6, further including manually operable switch means connected between said voltage responsive switching means and said valve means for permitting said valve means to be opened to refill said system, after the condition causing said leak has been remedied.

8. A hot water heating system having means for cutting off the water supply in response to a leak, which comprises:
tank means for heating water contained therein;
an inlet pipe for delivering cold water to said tank means to be heated;
an outlet pipe for receiving hot water from said tank means;
valve means for selectively admitting or cutting off cold water flow through said inlet pipe;
a first flapper valve having a permanent magnet attached thereto and being disposed within said inlet pipe so as to be freely pivotable between a fully seated position during periods of no water flow through said inlet pipe to an unseated position during periods of water flow through said inlet pipe;
a second flapper valve having a permanent magnet attached thereto and being disposed within said outlet pipe so as to be freely pivotable between a fully seated position during periods of no water flow through said outlet pipe to an unseated position during periods of water flow through said outlet pipe;
a first switch having a permanent magnet attached thereto and disposed outside said inlet pipe adjacent said first flapper valve so as to be responsive to pivotal movements thereof;
a second switch having a permanent magnet attached thereto and disposed outside said outlet pipe adjacent said second flapper valve so as to be responsive to pivotal movements thereof; and
electric circuit means connected to said first and second switches for actuating said value means to cut off cold water flow through said inlet pipe in response to the concomitant unseated position of said first flapper valve and seated position of said second flapper valve.

9. The system as set forth in claim 8, wherein one of said first and second switches is open during periods of no water flow through its associated pipe and the other of said switches is closed during periods of no water flow through its associated pipe, the positions of said switches being reversed during periods of water flow through their respective pipes.

10. The system as set forth in claim 9, wherein said electric circuit means is responsive to the concomitant closure of said first and second switches for actuating said valve means to cut off cold water flow through said inlet pipe.

11. The system as set forth in claim 10, wherein said first and second switches each include a moveable contact and a stationary contact, the stationary contact of one of said switches being electrically connected to the moveable contact of the other, the permanent magnets of each of said switches being connected to their respective moveable contacts.

12. The system as set forth in claim 9, wherein the contacts of said first switch are normally open during periods of no water flow through said inlet pipe, and the contacts of said second switch are normally closed during periods of no water flow in said outlet pipe, and first and second swtiches being responsive to water flow through their associated pipes to close and open respectively.

* * * * *